United States Patent
Chang et al.

(10) Patent No.: US 7,778,961 B2
(45) Date of Patent: *Aug. 17, 2010

(54) DELAYED DELETION OF EXTENDED ATTRIBUTES

(75) Inventors: Joon Chang, Austin, TX (US); Zachary M. Loafman, Austin, TX (US); Jean-Philippe Sugarbroad, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 404 days.

This patent is subject to a terminal disclaimer.

(21) Appl. No.: 11/965,805

(22) Filed: Dec. 28, 2007

(65) Prior Publication Data

US 2008/0104129 A1    May 1, 2008

Related U.S. Application Data

(63) Continuation of application No. 10/920,905, filed on Aug. 18, 2004, now Pat. No. 7,340,487.

(51) Int. Cl.
*G06F 7/00* (2006.01)
*G06F 17/00* (2006.01)

(52) U.S. Cl. .............. 707/609; 707/648; 707/661; 707/821

(58) Field of Classification Search .......... 707/609, 707/648, 661, 821
See application file for complete search history.

(56) References Cited

U.S. PATENT DOCUMENTS

| 5,740,432 | A | * | 4/1998 | Mastors ........................ 1/1 |
| 5,884,298 | A | * | 3/1999 | Smith et al. ................... 1/1 |
| 5,946,677 | A | * | 8/1999 | Bullen .......................... 1/1 |
| 2002/0129028 | A1 | * | 9/2002 | Chang et al. ............. 707/100 |
| 2002/0182332 | A1 | | 9/2002 | Chang et al. |
| 2003/0182332 | A1 | | 9/2003 | McBrearty et al. |
| 2005/0131900 | A1 | * | 6/2005 | Palliyll et al. ............ 707/10 |
| 2007/0174428 | A1 | * | 7/2007 | Lev Ran et al. ......... 709/218 |
| 2007/0244920 | A1 | * | 10/2007 | Palliyil et al. .......... 707/102 |

OTHER PUBLICATIONS

Fukuda, et al.; Method to Ensure the Integrity of File Operations in a Database Transaction; July 1995; pp. 475-478; TBD vol. 38 n7; JP.
Pipitone; Two Phase File Deletion; April 1993; pp. 373-376; TDB vol. 36 n4; US.

* cited by examiner

*Primary Examiner*—Khanh B Pham
*Assistant Examiner*—Azam Cheema
(74) *Attorney, Agent, or Firm*—H. Artoush Ohanian; Justin Dillon; Biggers & Ohanian, LLP.

(57) ABSTRACT

Methods, systems, and products for delayed deletion of extended attributes associated with a file in a file system are provided. Embodiments include identifying a file to delete, moving an extended attribute directory associated with the file to a background deletion directory, deleting the file, and deleting in the background the extended attribute directory. Some embodiments also include deleting an ACL associated with the file.

6 Claims, 4 Drawing Sheets

DELAYED DELETION OF EXTENDED ATTRIBUTES

BACKGROUND OF THE INVENTION

1. Field of the Invention

The field of the invention is data processing, or, more specifically, methods, systems, and products for delayed deletion of extended attributes associated with a file in a file system.

2. Description of Related Art

Extended attributes are name-value pairs associated with files and directories and typically containing information about the associated file. Extended attributes often provide additional functionality to the use of files in a file system. One advantage of using extended attributes is that the information stored in the extended attribute is stored outside of the file contents themselves. That is, the extended attribute separates its information about the file from the file information itself. Extended attributes are often application-specific or user-specific extensions to the normal attributes which are associated with the file representations in a file system such as, for example, an inode in an Enhanced Journaled File System ("JFS2") available in the AIX™ operating system.

With the increased use of extended attributes in many systems such as, for example, Portable Operating System Interface ("POSIX") and Network File System version 4 Protocol ("NFSv4") many files have associated with them an extensive tree of extended attributes. Recursively deleting these extended attributes, through for example, an unlink operation in Unix systems can be cumbersome and result in perceived performance degradation. There is therefore a need for improved deletion of extended attributes associated with a file in a file system that operates transparently to users and foreground processes.

SUMMARY OF THE INVENTION

Methods, systems, and products for delayed deletion of extended attributes associated with a file in a file system are provided. Embodiments include identifying a file to delete, moving an extended attribute directory associated with the file to a background deletion directory, deleting the file, and deleting in the background the extended attribute directory. Some embodiments also include deleting an ACL associated with the file.

In many embodiments, deleting in the background the extended attribute directory includes deleting extended attributes whose references have been released. In typical embodiments, deleting in the background the extended attribute directory includes deferring the deletion of an extended attribute having an open reference.

In typical embodiments, moving an extended attribute directory associated with the file to a background deletion directory includes creating, in a log, a log entry representing moving an extended attribute directory associated with the file to a background deletion directory. In many embodiments, deleting in the background the extended attribute directory includes creating, in a log, a log entry representing each deletion of an extended attribute. Many embodiments include replaying a log and deleting an extended attribute in dependence upon the log.

The foregoing and other files, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Introduction

The present invention is described to a large extent in this specification in terms of methods for delayed deletion of extended attributes associated with a file in a file system. Persons skilled in the art, however, will recognize that any computer system that includes suitable programming means for operating in accordance with the disclosed methods also falls well within the scope of the present invention. Suitable programming means include any means for directing a computer system to execute the steps of the method of the invention including, for example, systems comprised of processing units and arithmetic-logic circuits coupled to computer memory, which systems have the capability of storing in computer memory, which computer memory includes electronic circuits configured to store data and program instructions, programmed steps of the method of the invention for execution by a processing unit.

The invention also may be embodied in a computer program product, such as a diskette or other recording medium, for use with any suitable data processing system. Embodiments of a computer program product may be implemented by use of any recording medium for machine-readable information, including magnetic media, optical media, or other suitable media. Persons skilled in the art will immediately recognize that any computer system having suitable programming means will be capable of executing the steps of the method of the invention as embodied in a program product. Persons skilled in the art will recognize immediately that, although most of the exemplary embodiments described in this specification are oriented to software installed and executing on computer hardware, nevertheless, alternative embodiments implemented as firmware or as hardware are well within the scope of the present invention.

Delayed Deletion Of Extended Attributes

Figure 1:
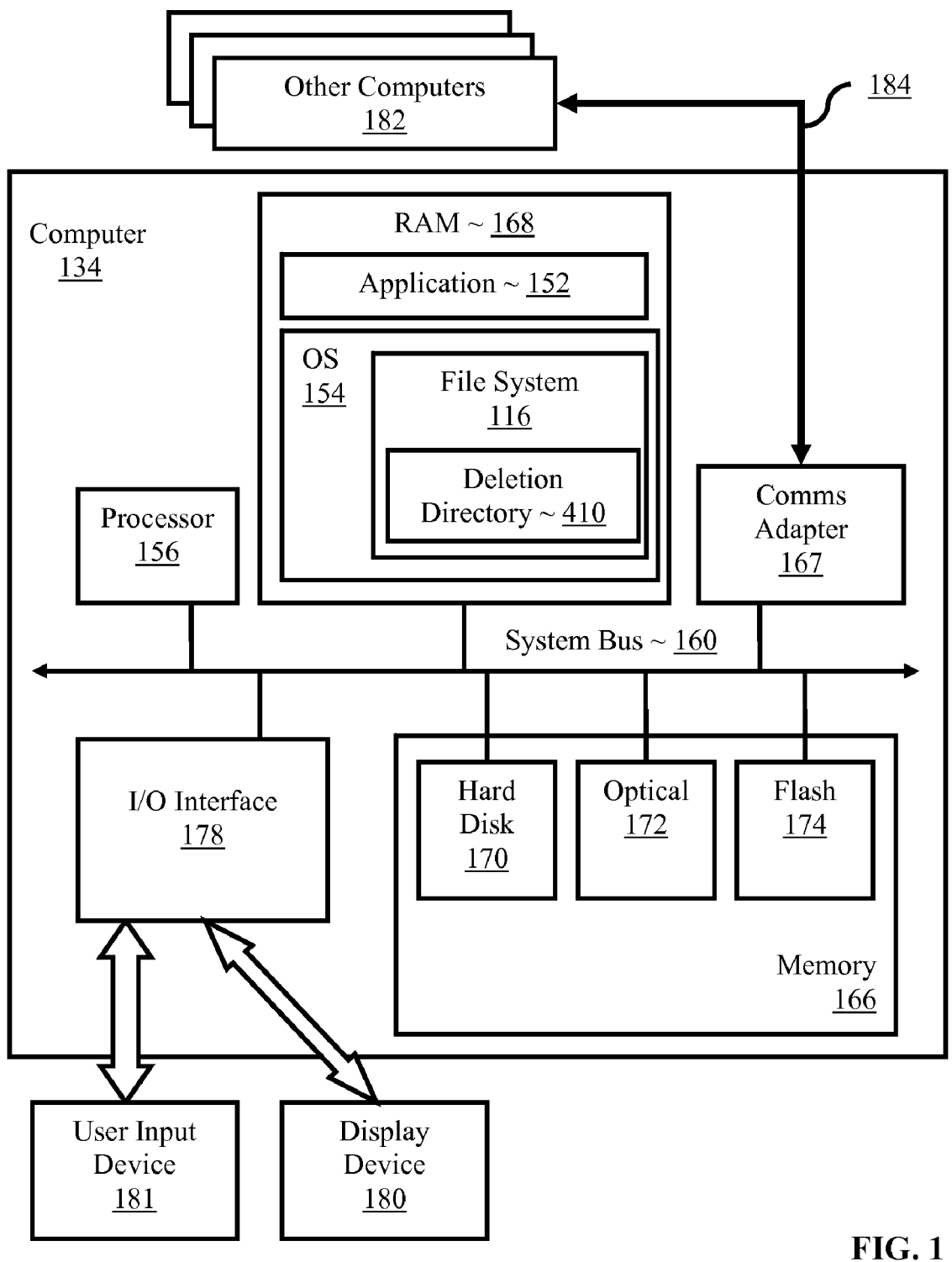
FIG. 1 sets forth a block diagram of automated computing machinery comprising a computer useful according to various embodiments of the present invention.

Exemplary methods, systems, and computer program products for delayed deletion of extended attributes associated with a file in a file system according to embodiments of the present invention are described with reference to the accompanying drawings, beginning with FIG. 1. FIG. 1 sets forth a block diagram of automated computing machinery comprising a computer (134) useful according to various embodiments of the present invention. The term "computer,"

in this specification, refers to any automated computing machinery. The term "computer" therefore includes not only general purpose computers such as laptops, personal computer, minicomputers, and mainframes, but also devices such as personal digital assistants ("PDAs"), network enabled handheld devices, internet-enabled mobile telephones, and so on.

The computer (134) of FIG. 1 includes at least one computer processor (156) or 'CPU' as well as random access memory (168) ("RAM"). Stored in RAM (168) is an application program (152). Application programs useful in accordance with various embodiments of the present invention include word processors, spreadsheets, database management systems, as well as many others that will occur to those of skill in the art.

Also stored in RAM (168) is an operating system (154). The operating system of FIG. 1 also includes a file system (116) having installed upon it a deletion directory (410). The exemplary operating system (154) of FIG. 1 is capable of delayed deletion of extended attributes associated with a file in the file system (116) according to embodiment of the present invention. The operating system (154) is capable of identifying a file to delete, moving an extended attribute directory associated with the file to the background deletion directory (410), deleting the file, and deleting in the background the extended attribute directory. Operating systems capable of modification to perform delayed deletion of extended attributes in accordance with the present invention include Unix, AIX™, Linux™, Microsoft NT™, and others as will occur to those of skill in the art.

In this specification the phrase "in the background" refers to background processing. Multitasking computers are capable of executing several tasks or programs, some in the foreground and some in the background, by alternating processor time among the various tasks or programs. The foreground processes often accept input from other processes or users. Background processes typically run transparently to a user and have a lower priority than foreground processes so that despite their ongoing execution they do not interfere with foreground processes.

The example computer (134) of FIG. 1 includes computer memory (166) coupled through a system bus (160) to the processor (156) and to other components of the computer (134). Computer memory (166) may be implemented as a hard disk drive (170), optical disk drive (172), electrically erasable programmable read-only memory space (so-called 'EEPROM' or 'Flash' memory) (174), RAM drives (not shown), or as any other kind of computer memory as will occur to those of skill in the art. The example computer (134) of FIG. 1 also includes a communications adapter (167) that implements connections for data communications (184) to other computers (182). Communications adapters (167) implement the hardware level of data communications connections through which client computers and servers send data communications directly to one another and through networks. Examples of communications adapters (167) include modems for wired dial-up connections, Ethernet (IEEE 802.3) adapters for wired LAN connections, 802.11 adapters for wireless LAN connections, and Bluetooth adapters for wireless microLAN connections.

The example computer (134) of FIG. 1 also includes one or more input/output interface adapters (178). Input/output interface adapters (178) include hardware that implements user input/output to and from user input devices (181) and display devices (180).

Figure 2:
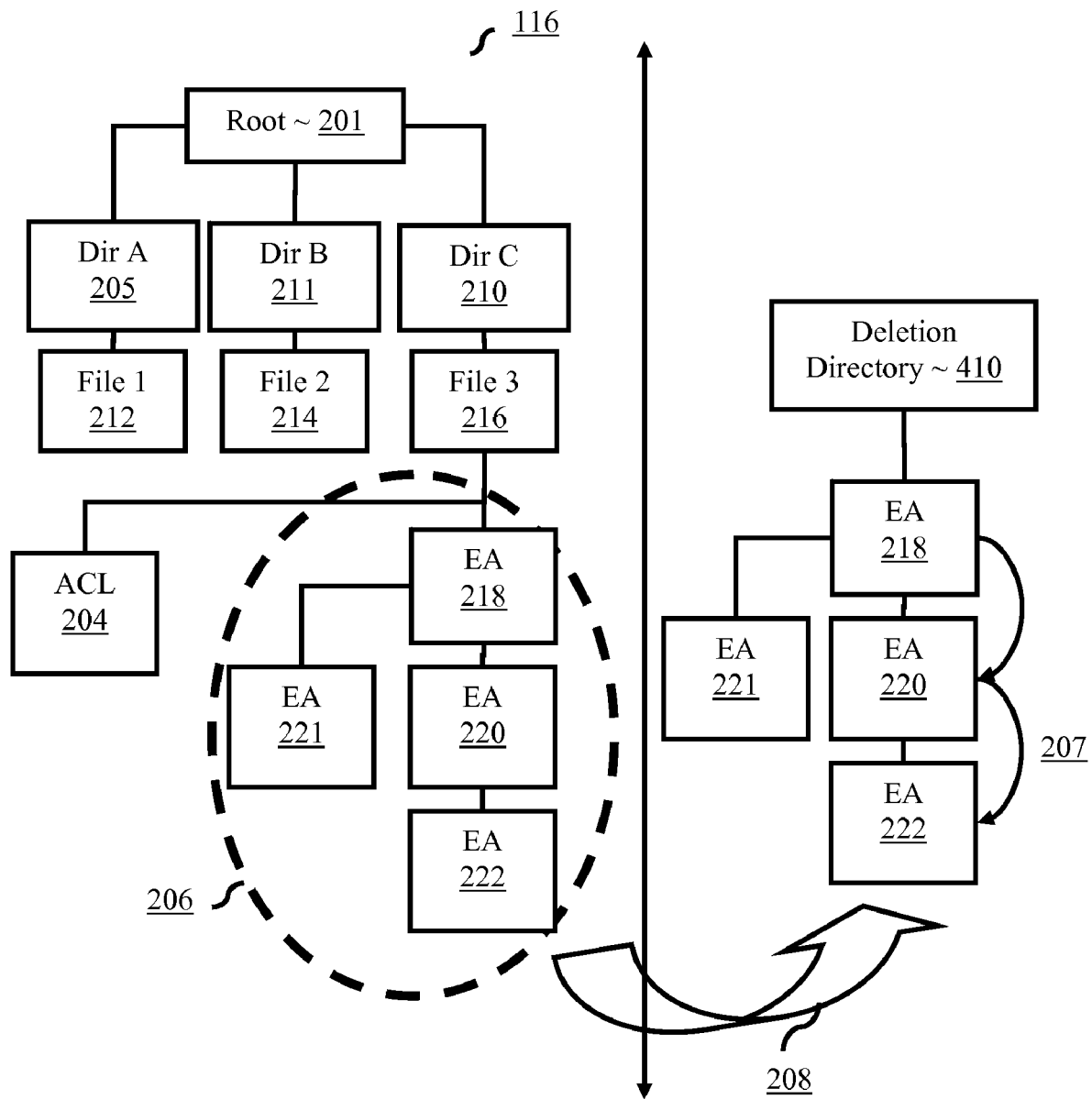
FIG. 2, sets forth a line drawing illustrating an exemplary method for delayed deletion of extended attributes associated with a file in a file system.

For further explanation, FIG. 2 sets forth a line drawing illustrating an exemplary method for delayed deletion of extended attributes associated with a file in a file system. The example of FIG. 2 illustrates an exemplary tree structured file system (116) having an exemplary root directory (201), and three exemplary directories, directory A (205), directory B (211), and directory C (210). In the example of FIG. 2, directory A (205) has within it exemplary file 1 (212) whose pathname may be represented as root/DirA/file1. In the example of FIG. 2. directory B (211) has within it exemplary file 2 (214) whose pathname may be represented as root/DirB/file2. In the example of FIG. 2, directory C (210) has within it exemplary file 3 (216) whose pathname may be represented as root/DirC/file 3.

The exemplary file 3 (216) of FIG. 2 has an associated access control list (204) and a tree structured directory (206) of associated extended attributes (218, 221, 220, 222). An access control list is a data structure associated with a file that includes permissions designating access rights to the associated file for particular users or groups of users. Examples of such permissions include 'read,' 'write,' 'execute,' and so on.

As discussed above, extended attributes are name-value pairs associated with files and directories. In the example of FIG. 2, delayed deletion of extended attributes (218, 220, 221, 222) associated with file 3 (216) in the exemplary file system (116) is carried out by identifying the file (216) for deletion and moving (208) the extended attribute directory (206) containing all the associated extended attributes (218, 220, 221, 222) to a background deletion directory (410).

The example of FIG. 2 continues delayed deletion of extended attributes by deleting file 3, deleting the associated access control list (204), and then subsequently deleting (207) in the background the extended attribute directory (218, 220, 221, 222). Deleting (207) in the background the extended attribute directory (218, 220, 221, 222) typically includes dispatching a separate background deletion process that operates asynchronously and in the background to recursively delete the extended attribute directory. Deleting the extended attribute directory typically also includes deferring the deletion of extended attributes having an open reference and deleting only extended attributes whose references have been released.

One way of recursively deleting the extended attribute directory that defers deletion of extended attributes having an open references is carried out in Unix systems by use of the unlink( ) function dispatched as a background process through the use of the "&" command. In such examples, unlink( ) accepts the pathname of the extended attributes in the deletion directory as a parameter and removes each link and decrements a link count of the extended attribute directory. When the extended attribute directory link count becomes 0 and no process has an extended attribute open, the space occupied by the extended attribute directory file will be released and the extended attributes are no longer accessible. If one or more processes have an extended attribute open when the last link is removed, the link is removed before unlink( ) returns, but the removal of the extended attribute contents is postponed until all references to the extended attribute are closed. Deleting (207) in the background the extended attribute directory (218, 220, 221, 222) advantageously makes deletion of the extended attribute directory transparent to users and foreground processes.

The organization and number of elements of the exemplary file system of FIG. 2 are for example and not for limitation. In fact, delayed deletion of extended attributes according to embodiments of the present invention may implemented on file systems having any number of directories, files, extended attributes, access control lists, and other elements as will occur to those of skill in the art.

The exemplary method of delayed deletion of extended attributes of FIG. 2 includes a plurality of steps and if the operating system experiences a crash prior to executing the method of FIG. 2, the directory of extended attributes will not have been properly deleted thereby resulting in unreleased disk space that would otherwise be available to the system. In this specification the term 'crash' means any failure causing the method of FIG. 2 to be interrupted and preventing its completion. To accommodate crashes, most operating systems provide mechanisms for logging transactions such that the state of the file system can be recovered. Typical operating systems operate by logging the metadata associated with files. The logged metadata typically includes most information concerning a file except the actual data inside the file. Elements of the file such as its physical location and size are tracked by the metadata. With logging, whenever something changes in the metadata of a file, this new attribute information will be logged into a reserved area of the file system.

Figure 3:
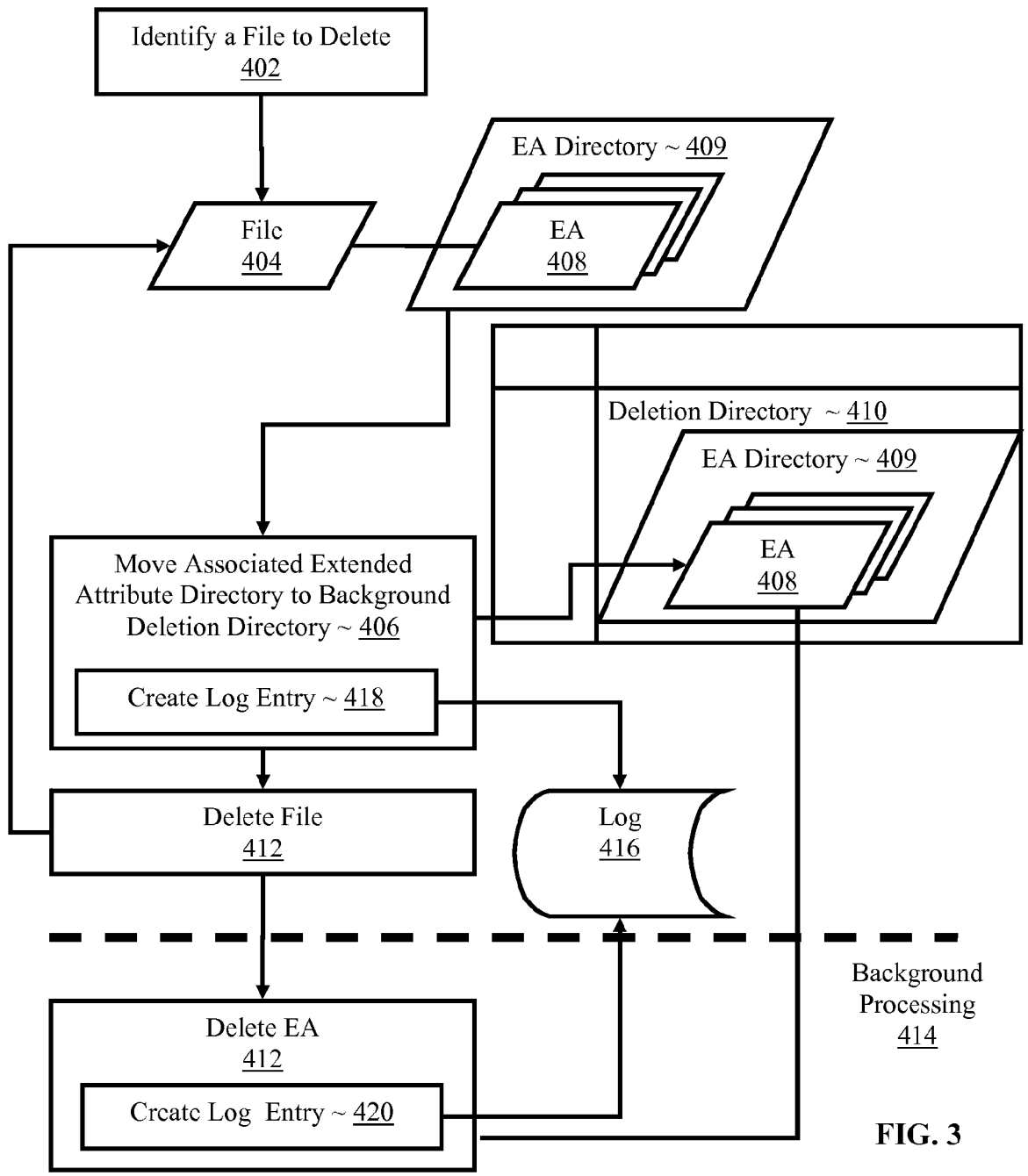
FIG. 3 sets forth a flow chart illustrating an exemplary method for delayed deletion of extended attributes associated with a file in a file system.

For further explanation, FIG. 3 sets forth a flow chart illustrating an exemplary method for delayed deletion of extended attributes associated with a file in a file system that includes logging transactions so that the stated of delayed deletion of extended attributes can be recovered in the event of a system crash. The method of FIG. 3 includes identifying (402) a file (404) to delete and moving (406) an extended attribute directory (409) associated with the file (404) to a background deletion directory (410). In the method of FIG. 3, moving an extended attribute directory associated with the file to a background deletion directory includes creating (418), in a log (416), a log entry representing moving the extended attribute directory associated with the file to the background deletion directory.

The method of FIG. 3 continues by deleting (412) the file (404) and deleting (412) in the background (414) the extended attribute directory (409). In the method of FIG. 3, deleting (412) in the background (414) the extended attribute directory (409) is typically carried out by recursively deleting extended attributes of the extended attribute directory associated with the file (404). The method of FIG. 3 also includes creating (420), in a log (416), a log entry representing each deletion of an extended attribute. Creating (420), in a log (416), a log entry representing each deletion of an extended attribute of the extended attribute directory advantageously allows identifying the undeleted extended attributes after a crash and resuming deletion of the extended attribute directory in the background.

Delayed deletion of extended attributes according to embodiments of the present invention typically includes deleting any ACLs associated with the file in the foreground when the file is deleted. ACLs are typically small and therefore do not warrant being moved to the background deletion directory for background deletion. Delayed deletion of extended attributes according to embodiments of the present invention may alternatively include moving any ACLs associated with the file to the background, logging the transaction of moving the ACLs to the deletion directory, and then deleting the ACLs in the background with the extended attribute directory.

Figure 4:
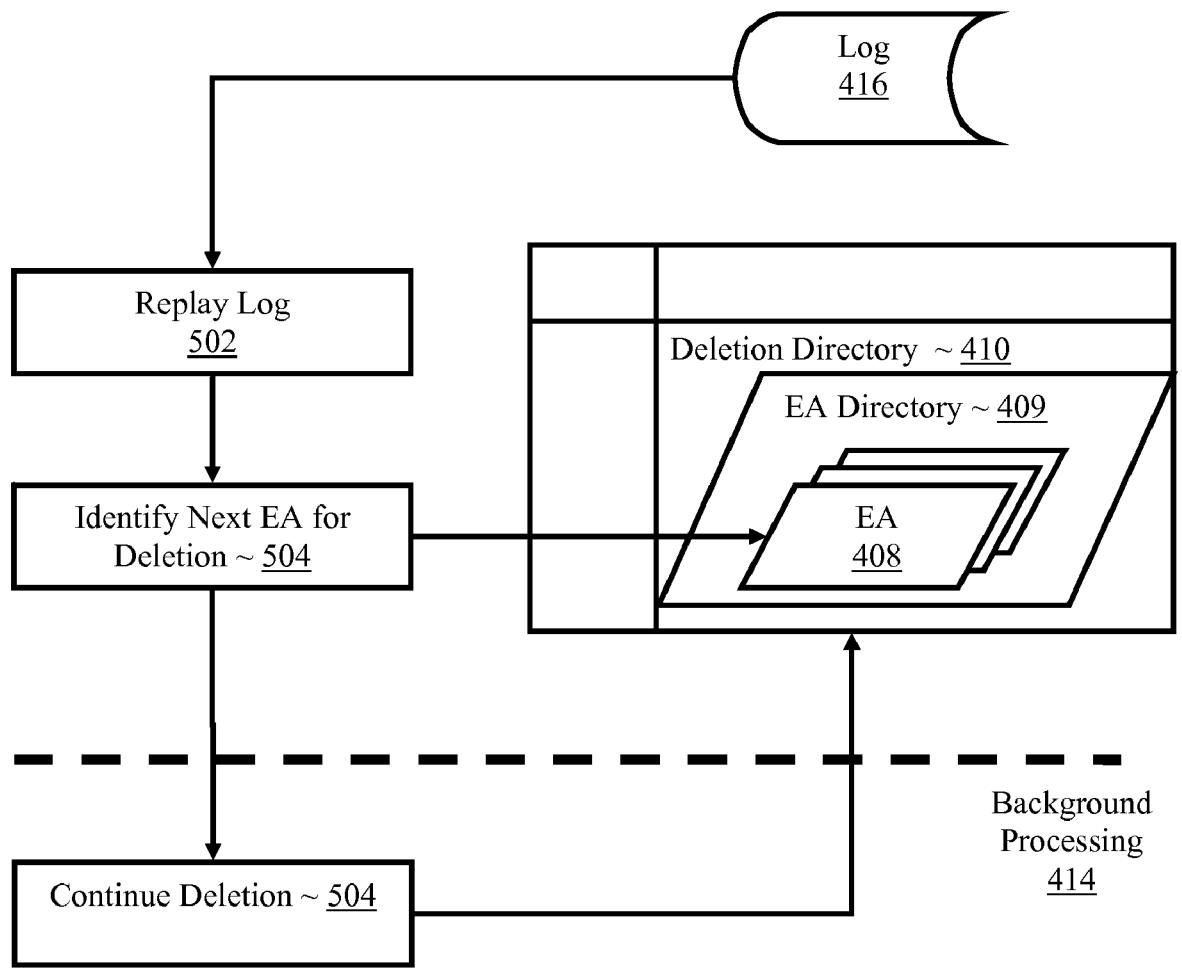
FIG. 4 sets forth a flow chart illustrating an exemplary method of continuing to delete the extended attribute directory associated with the deleted file in the background after a crash.

In the example of FIG. 3, if the operating system crashes after moving (406) the extended attribute directory to the deletion directory (410), but before background deletion of the extended attribute directory, then objects in file will not have been deleted and the extended attribute directory will remain in the deletion directory and deletion may continue in the background. If the system crashes after the background deletion of the extended attribute directory begins but before the background deletion completes, some extended attributes remain in the deletion directory and occupy disk space that could otherwise be released. For further explanation, FIG. 4 illustrates a method of continuing to delete the extended attribute directory associated with the deleted file in the background after a crash. The method of FIG. 4 includes replaying (502) the log (416) and identifying (504) for deletion the next undeleted extended attribute (408). The method of FIG. 4 then continues (504) by deleting in the background (414) the remaining undeleted extended attributes in the extended attribute directory (409) in the background.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A system for delayed deletion of extended attributes associated with a file in a file system, the system comprising:
   means for identifying a file to delete;
   means for moving an extended attribute directory associated with the file to a background deletion directory, wherein means for moving an extended attribute directory associated with the file to a background deletion directory further comprises means for creating, in a log, a log entry representing moving an extended attribute directory associated with the file to a background deletion directory;
   means for deleting the file; and
   means for asynchronously and recursively deleting in the background the extended attribute directory, wherein means for deleting in the background the extended attribute directory further comprises means for deferring the deletion of an extended attribute having an open reference;
   means for deleting an access control list ('ACL') associated with the file.

2. The system of claim 1 wherein means for deleting in the background the extended attribute directory further comprises means for creating, in a log, a log entry representing each deletion of an extended attribute.

3. The system of claim 1 further comprising means for replaying a log and deleting an extended attribute in dependence upon the log.

4. A computer program product for delayed deletion of extended attributes associated with a file in a file computer program product, the computer program product comprising:
   a recording medium;
   means, recorded on the recording medium, for identifying a file to delete;
   means, recorded on the recording medium, for asynchronously and recursively moving an extended attribute directory associated with the file to a background deletion directory, wherein means, recorded on the recording medium, for moving an extended attribute directory associated with the file to a background deletion directory further comprises means, recorded on the recording medium, for creating, in a log, a log entry representing moving an extended attribute directory associated with the file to a background deletion directory;
   means, recorded on the recording medium, for deleting the file;
   means, recorded on the recording medium, for deleting in the background the extended attribute directory, wherein means, recorded on the recording medium, for deleting in the background the extended attribute director further comprises means, recorded on the recording medium, for deferring the deletion of an extended attribute having an open reference; and means, recorded on the recording medium, for deleting an access control list ('ACL') associated with the file.

5. The computer program product of claim 4 wherein means, recorded on the recording medium, for deleting in the background the extended attribute directory further comprises means, recorded on the recording medium, for creating, in a log, a log entry representing each deletion of an extended attribute.

6. The computer program product of claim 4 further comprising means, recorded on the recording medium, for replaying a log and deleting an extended attribute in dependence upon the log.

* * * * *